Patented Oct. 31, 1944

2,361,376

UNITED STATES PATENT OFFICE 2,361,376

PRODUCTION AND UTILIZATION OF VITREOUS ENAMELS

Lyman Cyrus Athy and Paul C. Stufft, Baltimore, Md., assignors to Pemco Corporation, a corporation of Maryland No Drawing. Application August 12, 1941, Serial No. 406,542

20 Claims. (Cl. 106—48)

The present invention relates to the production and ultilization of vitreous enamels, the latter being especially suitable for use as ground coat enamels. It is well known that enamels of this character obtain their ability to fuse and bond to metal bases when heated to high temperatures through the medium of the so-called adherence oxides which are preferably and unusually incorporated in the glass or enamel frit, but which may at least in part be incorporated in the final enamel composition during the milling operation prior to the application of the enamel composition to a metal base and the subsequent heating and fusing of the enamel composition.

It is well known that oxides of cobalt, nickel and possibly manganese function to produce the adherence or bonding effect in vitreous enamels. It is also known that certain other materials, especially molybdenum, will produce a similar effect, although not in sufficient amount to be commercially usable unless an auxiliary adherence agent be present in the enamel composition. Further, it is desired to point out that antimony compounds, as for example, an antimony oxide, if present in the enamel compositions in a sufficient amount do produce a commercial adherence when the enamel composition is fused onto a metal base. However, when the antimony compound is added to the enamel composition in a sufficient amount to produce a satisfactory commercial adherence, it is reduced during the firing of the enamel composition and produces dark colored spots on the surface of the fused enamel, thereby inhibiting the use of such a composition for commercial purposes since it is not possible to merchandise an enamel having an appearance of this character.

It is also well known to compound an enamel composition by having present therein a cobalt containing compound as, for example, a cobalt oxide in amounts ranging from .5% to about 2%, a composition of this type on firing adhering best when the cobalt oxide used in the compounding thereof is present in amounts of 1% or somewhat greater. Nickel oxide in small amounts does not normally have sufficient adhering properties to produce a satisfactory commercial bond, but this compound may be substituted in part for cobalt oxide and then the composite cobalt oxide-nickel oxide adherence agent functions satisfactorily. Usually when nickel oxide is substituted for part of the cobalt oxide content of the vitreous enamel composition, the substitution ratio is 2 parts nickel oxide for each part of cobalt oxide which has been replaced. Manganese dioxide has been used for many years in vitreous enamel compositions in the amount of approximately 1% in conjunction with cobalt and nickel oxides which function as the primary adherence agent. Whether manganese dioxide actually acts as a secondary adherence agent when used in combination with cobalt and nickel oxides may be questioned.

It has been discovered that if the enamel is compounded with an antimony-containing constituent in a predetermined amount not exceeding that causing the appearance of fuzziness in the fired enamel, that the amount of cobalt-containing material required to secure bonding and adherence of the fired vitreous enamel to a metal base, as, for example, an iron, steel, or alloy base is greatly reduced. Further, the rather surprising discovery has been made that the adherence of the fired enamel containing the composite cobalt-antimony adherence agent may be obtained in the absence of nickel oxide and/or manganese oxides.

It has been further discovered that if to the enamel containing the composite antimony-cobalt adherence agent, there is also added a phosphorus-containing material, that the latter functions to substantially increase the burning range of the enamel, the maximum amount of phosphorus-containing constituent present in the compounded enamel prior to its firing being that which inhibits any appearance of roughness in the fired enamel.

It has further been discovered that while the amounts of cobalt-, antimony- and phosphorus-containing constituents may vary over a comparatively wide range, that as the amounts of antimony- and phosphorus-containing constituents are reduced, the amount of cobalt-containing constituent is increased.

Similarly, when the amount of cobalt-containing constituent is decreased, the antimony- and phosphorus-containing constituents may be increased, and the enamel will have a commercial adherence to an iron or steel base even though the amount of cobalt oxide therein is exceedingly small, as from .05% to .9%, and preferably .15% to .3%, taken on the smelted frit. For example, in the preferred form of the invention, the raw vitreous enamel batch has incorporated therein cobalt oxide in an amount equivalent to 0.25% in the frit, together with a phosphorus-containing constituent, as, for example, di-sodium phosphate monhydrate, the amount of the latter in the smelted frit being equivalent to 1% $P_2O_5$.

The frit produced from vitreous enamel having the above adherence agent was milled with about 1% of antimony oxide, that is, one pound of antimony oxide per 100 pounds of frit added to the mill. If, in the above example, the cobalt oxide constituent be decreased to about 0.05% in the smelted frit, it is then desirable to increase the phosphorus-containing constituent to approximately 3% expressed as $P_2O_5$ in the smelted frit; and the antimony-containing constituent to approximately 5% taken on the weight of the frit present in the milled enamel. Similarly, if the cobalt oxide content be increased to .3%, the $P_2O_5$ of the frit or milled glass may be decreased to .5% and the amount of antimony oxide milled in to .5%, taken on the weight of the frit present in the milled enamel.

It has also been discovered that the antimony and cobalt constituents appear to activate each other; and that the phosphorus containing compound also appears to activate the antimony constituent, the cobalt constituent, and the antimony-cobalt constituent taken as an entity, so that not only adherence of the fired enamel to the iron or steel base occurs with a lower amount of adherence agents than would be required to give comparable adherence if the adherence agents were used alone, or in conjunction with other oxides well known in the art; but also the use of the antimony, cobalt and phosphorus containing adherence agent makes it possible for the enamel containing the same to develop its adherence to the metal base at a far lower temperature than has hitherto been employed. For example, it is well known that the proper maturing temperature for cobalt ground coat enamel is normally 1580° F., and that the minimum firing conditions under the best conditions is about 1525 to 1530° F. It is also known that if a vitreous enamel is compounded with a phosphorus containing agent and with antimony, but without cobalt or other adherence agents, in order for such an enamel to adhere to a metal base it is necessary to fire at a temperature in the neighborhood of 1550° F., and this although the enamel contain only antimony in a sufficient amount to in itself provide the necessary adherence. However, it has been discovered that the composite adherence agent of the present invention when incorporated in a prior art porcelain enamel enables said enamel to be fired at a temperature as low as about 1475° F., said enamel bonding with and adhering exceedingly well to the metal base to which it is applied.

According to the preferred form of the invention, there is provided a milled ground coat vitreous enamel adapted to be fired onto an iron base, said vitreous enamel having as its essential components a frit product derived from a raw batch of refractory and fluxing constituents, and a milled addition product, one of said products containing a cobalt adherence agent in an amount sufficient to cause the enamel on being fired and fused to adhere to a metal base, said cobalt constituent not exceeding .9% based on the weight of the smelted glass or frit present in the milled enamel. There is also present in the milled ground coat a phosphorus containing constituent in an amount adapted to substantially increase the burning range of the enamel while inhibiting any appearance of roughness in the fired enamel. The milled enamel also contains an antimony containing medium in an amount adapted to promote the adherence of the enamel on its being fused to an iron base while simultaneously inhibiting any appearance of fuzziness in the fired enamel. In a more specific aspect of the invention as above set forth, the cobalt constituent may vary in an amount between .05% and .9% expressed as cobalt oxide $Co_3O_4$ taken on the weight of the milled enamel deprived of its water content. The phosphorus containing adherence constituent in a more limited form of the invention may vary between 0.25% to 4% expressed as phosphorus pentoxide, said weight being taken on the weight of the smelted enamel batch or frit which is milled together with addition agents.

It is desired to point out that the cobalt oxide is preferably incorporated in the raw enamel batch which contains refractory and fluxing constituents and that the cobalt is smelted in the enamel. Likewise, it is preferred that the phosphorus containing adherence agent as, for example, di-sodium phosphate monohydrate, should be smelted in the raw batch; and preferably the antimony adherence agent should be milled in with the frit. However, the antimony containing adherence agent may be also smelted in the raw enamel batch.

While the best results are obtained by smelting in cobalt oxide and the phosphorus containing material, it is recognized that any and all of the three adherence agents herein set forth may be smelted in the raw enamel batch or milled in with the frit resulting from the smelting of a normal vitreous enamel batch.

In the specific form of the invention, it has been discovered that when an antimony compound preferably in the form of antimony oxide as, for example, antimony trioxide, in amounts ranging from .1% to 5% is added to the enamel glass or frit during the milling operation, the amount of cobalt oxide required to secure commercial adherence of the fused and fired vitreous enamel is reduced from the amounts ordinarily used in commercial ground coats to as little as 0.05%. Preferably the amount of antimony containing compound which is milled in with the frit is in the neighborhood of .5% to 2.25% as with this amount of antimony adherence agent it is only necessary to use from 0.15% to 0.25% of the cobalt oxide, the percentage of the latter being taken on the weight of the fritted enamel batch. Further, when using the above preferred ranges of composite antimony and cobalt containing adherence agents, the necessity for using nickel oxide and manganese oxide as adherence agents is eliminated.

In the more specific aspect of the invention, it has been discovered that when a phosphorus-containing agent is present in the smelted frit, in amounts ranging from 0.25% to 4%, expressed as $P_2O_5$, or is added to the frit in said amounts taken to the weight of the frit present in the milled enamel, that not only does the enamel have excellent adherence properties, with an exceedingly low cobalt-oxide content, but that the firing range of the enamel has been increased from about 75° F. to about 125° F., so that the enamel may be fired without harming the enamel finish in a range varying between 1475° F. to 1600° F., a range of 125° F. The firing range of the vitreous enamel of the present invention is much greater than that of a normal ground coat enamel, which has a normal firing range of approximately 1530° F. to 1600° F. or slightly less. The point which it is desired to emphasize is that the combination of a phosphorus-containing constituent in approximately the amounts set forth, together with an antimony-containing and/or a cobalt-containing constituent, increases the firing range of the enamel from about 75° F. to 125° F.

While the invention herein disclosed may be utilized without the addition of a phosphorus containing material functioning as an adherence agent to the enamel containing the antimony and/or cobalt oxide adherence agent, the increased firing range produced by the addition of phosphorus containing compound makes the use of the latter extremely beneficial.

In the following table is set forth a raw batch mixture having present refractory and fluxing agents together with the phosphorus containing and cobalt containing adherence agents:

Table 1

| Raw batch mixture | | Calculated percentage batch comp. | |
|---|---|---|---|
| | Pounds | | Per cent |
| Flint | 17.5 | $SiO_2$ | 41.11 |
| Feldspar | 29.0 | $Al_2O_3$ | 5.36 |
| Anhydrous borax | 25.1 | $K_2O$ | 2.53 |
| Nitrate of soda | 2.3 | $Na_2O$ | 15.73 |
| Carbonate of soda | 8.3 | $B_2O_3$ | 18.75 |
| Fluorspar | 6.6 | $CaF_2$ | 7.18 |
| Whiting | 5.0 | $CaO$ | 3.04 |
| Barium carbonate | 6.0 | $BaO$ | 5.07 |
| Di-sodium phosphate-mon-hydrate | 1.8 | $P_2O_5$ | .98 |
| Cobalt oxide | .225 | $Co_3O_4$ | .25 |

The materials set forth in Table 1 may be mixed and smelted together in a conventional type smelter until a smooth thread is obtained upon withdrawing some of the material from the smelter. The material is smelted about three and one quarter hours at a final temperature of 1900° F. Thereafter the smelted material is fritted by pouring the smelted material into water.

Then 100 pounds of the material is charged into the mill along with 7 lbs. of clay, 8 ounces of hydrated borax, 1 pound of antimony trioxide, and 4 ounces of magnesium carbonate, and 40 pounds of water. This material is ground to a fineness of about 6% to 8% on a 200 mesh screen.

The enamel slip produced as above set forth may be applied by spraying or dipping. The article which is treated with the enamel slip may be given a ground coat of any thickness, but preferably there is applied to the article the conventional ground coat weight of 36 grams per square foot of metal surface. The iron or steel base to which the milled enamel is applied is fired at a firing range of 3 minutes at 1475° F. to 3 minutes at 1600° F., and even when using this wide firing range, there was no overburning and the adherence of the enamel to the metal base was exceedingly good. If the phosphorus containing constituent is eliminated from the mix set forth in Table 1, the firing range of the resulting enamel is greatly diminished and the enamel will show over-firing at 1525° F. to 1550° F., said over-firing producing in the enamel a fuzzy appearance. However, even without the phosphorus containing adherence agent, the adherence of the enamel to the metal base was quite satisfactory. If the cobalt oxide is eliminated from the raw batch which is smelted to produce the frit of the present invention at this low temperature of 1525° F. to 1550° F., no adherence of the enamel to the metal base is obtained. If the antimony is eliminated from the milled addition, no adherence develops in an enamel fired at a temperature of about 1525° F. to 1550° F.

If the cobalt oxide is eliminated from the raw enamel batch and only antimony oxide and $P_2O_5$ producing materials are smelted in or milled in as addition agents, then the enamel exhibits some adherence provided the enamel is fired at a relatively high temperature that is for about 3 minutes at about 1550° F., but the resulting enamel had a fuzzy appearance which made it substantially worthless as a commercial finish. However, in order to obtain adherence in the absence of cobalt oxide, it was necessary to increase the amount of antimony trioxide milled in from 1% to 2.25%; and if the antimony oxide was to be smelted in, there would have to be a corresponding increase in the amount of smelted in antimony used. The above emphasizes the advantage residing in keeping the antimony oxide low, namely, absence of a fuzzy appearance.

The antimony content of the enamel, whether it is a smelted in content or a milled in content, can be kept exceedingly low, preventing any fuzzy appearance if the raw batch mixture has a cobalt adherence agent added thereto in an amount expressed as cobalt oxide $Co_3O_4$ equal to .05% to 0.3% in the smelted enamel or frit. The cobalt oxide may also be milled in frit produced from a raw batch which did not contain any cobalt oxide or other cobalt adherence agents. In this case the percentages will also vary approximately between 0.05% to .3%, taken on the weight of the frit present in said milled enamel, or slightly less, if taken on the weight of the dry milled enamel which has clay and setting-up agents present.

If the raw batch material set forth in Table 1 which is devoid of any antimony component is milled with the milling ingredients above set forth, but without any antimony containing adherence agent, then on the application of the milled material to an iron or steel base, no adherence is obtained.

Instead of incorporating the antimony containing adherence agent in the mill batch together with the frit produced by the smelting operation, it is within the province of the present invention to smelt in the antimony constituent. An example of a suitable batch containing antimony trioxide is as follows:

Table 2

| | Pounds |
|---|---|
| Flint | 17.5 |
| Feldspar | 29.0 |
| Anhydrous borax | 25.1 |
| Nitrate of soda | 2.3 |
| Carbonate of soda | 8.3 |
| Fluorspar | 6.6 |
| Whiting | 5.0 |
| Barium carbonate | 6.0 |
| Di-sodium phosphate-mono-hydrate | 1.8 |
| Cobalt oxide | .225 |
| Antimony trioxide | 5.0 |

A raw batch of the character above set forth is smelted in the usual manner and is fritted by pouring into water. The resulting frit is then milled in the usual manner and with the usual milling constituents, with the exception that the constituents added in the milling do not impart adherence properties to the milled enamel mass.

It is preferred to mill in the antimony containing adherence agent rather than smelt it because experiments have shown that when the antimony containing adherence agent is milled in, it is more beneficial in promoting the adherence of the resulting enamel to an iron or steel base.

However, it is desired to point out that it is within the province of the present invention to smelt in a portion of the cobalt containing and the antimony containing adherence agents, and a portion of the phosphorus containing constituent and to mill in the remainder. For example, roughly about two-thirds of the cobalt oxide and the phosphorus containing material may be smelted in the enamel and the remainder of these adherence agents milled in or added to the enamel in the mill. All of the antimony containing adherence constituent may be smelted in the raw enamel batch when splitting the other two adherence agents as specified, or all of the antimony containing adherence agent may be milled in when the adherence agents are split in the manner specified, or in the alternative, a portion of the antimony containing adherence agent may be smelted in the raw batch enamel composition and the remainder milled in.

It is desired to point out that when the antimony containing adherence constituent is smelted in with the raw batch enamel charge, then it is preferred to eliminate from the raw batch charge any oxidizing agent as it has been discovered that the enamel does not adhere as well if the antimony constituent which was originally present as $Sb_2O_3$ or a compound of similar state of oxidation has been oxidized to a higher state of oxidation as, for example, to $Sb_2O_4$ or $Sb_2O_5$. As stated, while it is preferred to use an antimony containing constituent in which the antimony component has a trioxide valence or its equivalent, antimony in higher states of oxidation such as $Sb_2O_4$ or $Sb_2O_5$ may be used and fair results may be obtained as far as adherence is concerned.

When the antimony containing adherence agent is smelted in the raw batch charge as shown in Table 2, the amount of this adherence constituent expressed as the trioxide may vary between about 2% and about 5% taken on the weight of the fritted batch, the latter percentage being the preferred one.

When the antimony containing adherence agent is milled in with the smelted frit, as, for example, one produced from the charge set forth in Table 1, it is preferred to use about 1% of the antimony adherence agent expressed as antimony trioxide. However, the amount of the antimony containing adherence agent may be greatly varied and still come within the spirit of the present invention. Using the lower limit of .1% of antimony oxide with the cobalt oxide varying as herein set forth and with or without the phosphorus containing constituent in the amounts hereinbefore set forth, the enamel on application to an iron or steel base and being fused showed fair adherence. Better adherence was obtained when the antimony oxide was milled in in the amount of .5% taken on the weight of the frit charged into the mill; and the most satisfactory adherence results were obtained when 1% of antimony trioxide was milled in as set forth in the first example given wherein the antimony trioxide was milled in with the frit produced in the charge set forth in Table 1. When 2% of antimony oxide was added as a mill addition to about 100 pounds of frit and other milling ingredients as previously set forth, satisfactory adherence results were obtained when the so prepared milled enamel was applied to an iron or steel base and fired.

As the amount of antimony oxide which is added to 100 pounds of frit approaches 3%, there is a tendency for the resulting enamel to assume a fuzzy state and since this is not a commercial enamel, when the antimony containing adherence agent is milled in with the frit, it should be milled in in an amount adapted to promote the adherence of the enamel to the iron base while inhibiting any appearance of fuzziness in the fired enamel. When the antimony trioxide is milled in in an amount of and exceeding 5% taken on the weight of 100 pounds of frit used in the milling operation, dark colored specks appear in the fired enamel and this prohibits the satisfactory commercial use of the enamel.

While in the preferred form of the invention it is desired that the antimony containing adherence agent be in the form of antimony trioxide, other antimony compounds may be used, as, for example, antimony salts including the alkali-containing antimonates as, for example, sodium, lithium or potassium antimonates; and the alkaline earth antimonates as, for example, calcium antimonate.

When the antimony adherence agent is smelted in the batch constituents, the antimony may be any inorganic or organic compound which will furnish the antimony constituent to the mix and which will not deleteriously affect the desirable standard characteristics of a standard enamel. For example, while antimony sulfides may be used, these compounds are somewhat objectionable in that they inject a sulfur constituent in the enamel which for most purposes is undesirable.

In carrying out the present invention, it is desirable that the cobalt containing adherence agent should be smelted in as shown in Table 1 since experiments show that this procedure gives the most satisfactory results. However, it is within the province of the present invention to add the cobalt adherence agent to a vitreous enamel or porcelain enamel frit during the milling operation. Preferably the cobalt containing adherence agent is introduced during milling in such a state that it does not cause blistering when the milled enamel composition is applied to an iron or steel base and fired.

In the preferred form of the invention as set forth, the milled enamel composition contains a phosphorus containing adherence agent, the latter preferably being smelted in with the raw batch used to produce the frit which is subjected to the milling operation, although it is within the province of the present invention to mill in the phosphorus containing ingredient with a frit substantially free from phosphorus containing material together with the usual milling ingredients. When the phosphorus containing ingredient is smelted in, it is preferred to use phosphorus salts and especially di-sodium phosphate, as shown in Table 1. However, it is recognized that other phosphorus containing compounds may be used. The important constituent of the phosphorus containing compounds is the phosphorus pentoxide radical and therefore in general any phosphorus containing compound may be used which will furnish the phosphorus constituent and which will not have any deleterious effect upon the enamel. The alkali and the alkaline earth phosphates are the preferred phosphorus containing materials. More specifically, there may be used lithium phosphate, barium phosphate, potassium phosphate, refined rock phosphate, and the like. While the inorganic phosphorus containing compounds are preferably used as addition agents, it is within the province of the present invention to use organic phosphates provided the organic radical associated therewith has no deleterious effect on the enamel.

In general, it is desired to state that the maximum usable amounts of antimony adherence agent and phosphorus containing addition agent such as a compound furnishing phosphorus pentoxide will depend somewhat upon the composition of the frit used and/or that of the raw charge producing the frit. The criterion for the maximum permissible amount of antimony adherence agent has been set forth. The phosphorus containing constituent should be present in an amount which will substantially increase the burning range of the enamel while inhibiting any appearance of roughness in the fired enamel. The use of excess amounts of a phosphorus addition agent expressed as $P_2O_5$ gives rise not only to a very rough enamel ground coat, but to a blistery unfired appearance of the enamel where the phosphorus excess is considerable.

It is desired to point out that phosphorus containing addition agent may be used to increase the burning range of the prior art porcelain or vitreous enamel irrespective of whether the cobalt containing and/or the antimony containing adherence agents in the percentages herein set forth are smelted in with the prior art porcelain or vitreous enamel batches or milled in with a frit produced from any of the prior art porcelain or vitreous enamel batches.

It is understood that the term "iron or steel base" as used in the present specification and in the claims includes sheet iron and steel and alloys thereof. It is intended for the use of this term to exclude cast iron as the adherence of porcelain or vitreous enamels to cast iron depends upon a substantially different phenomenon than herein disclosed.

It is desired to point out that a portion of the cobalt oxide may be smelted in with the raw batch and the remainder of the cobalt oxide or equivalent cobalt-containing material milled in with the resulting frit, which already contains a portion of the cobalt-containing material functioning as an adherence agent. However, in the preferred form of the invention the predominating proportion of the cobalt-containing adherence agent is smelted in the raw batch. As a variation of the principal method herein set forth, there may be provided an antimony-containing and cobalt-containing complex, which may be milled in with the frit and form, with the latter, the final milled enamel of the present invention.

One method of carrying out the above is to make a glass containing the antimony and cobalt-containing constituents, said glass having the antimony constituent present in a soluble form, so that the antimony may be freed from the material or glass containing the same by the action of the aqueous constituent present during the milling operation. More specifically, 40 lbs. of borax may be mixed with 60 lbs. of antimony-trioxide and .5 lb. of cobalt oxide and the mixture smelted together and dry quenched, that is, cooled in the absence of water. This material is then ground to the same fineness as the frit which contains the remainder of the cobalt-containing adherence agent and then mixed with the latter in the ratio of 1.66 pounds of adherence material to 100 lbs. of frit. The frit, if desired, may contain a phosphorus-containing agent, functioning to lower the temperature for firing and to increase the burning range of the vitreous enamel. The resulting admixture is then milled with the regular mill additions, that is, 7 lbs. of clay and 4 oz. of magnesium-carbonate. Upon milling, the borax-containing frit liberates the antimony-containing component therein, the borax being soluble in water. The cobalt-oxide adherence component is also liberated from the borax glass or frit.

The amount of borax glass which is present in the smelted borax antimony-containing, cobalt-containing borax glass, can be varied at will. While borax is set forth as the glass carrier for the antimony-trioxide and cobalt-oxide, it is merely exemplary and may be replaced by any carrier which is soluble in the milling solution and which does not deleteriously affect the enamel.

The above clearly indicates that the antimony-containing adherence agent, and in part, the cobalt-containing agent, may be added in any form in which the antimony is not chemically combined to reduce its efficiency, and the cobalt may be added to the frit in any form in which it will not liberate any excess amount of free oxygen.

The borax glass containing borax as a carrier may also have present therein a portion of the phosphorus-containing addition product. However, it is best to incorporate the phosphorus-containing addition agent, or a predominating proportion thereof, in the raw batch so that it is smelted in rather than milled in.

The procedure above outlined provides great flexibility from a procedural standpoint, as it enables any frit which does not contain sufficient cobalt-oxide to have the latter added thereto during milling. The borax glass containing antimony-trioxide or its equivalent, and cobalt-oxide, or its equivalent, may be sold separately so that the enamelers may incorporate additional cobalt-oxide and all of the antimony-trioxide, or a portion thereof, all in accordance with each individual enameler's requirements.

In the present specification, it is stated that cobalt-containing, phosphorus-containing, and antimony-containing ingredients are present in the frit expressed as oxides. This is the customary manner of expressing the composition of the frit and refers to the composition of the frit on a calculated oxide basis. Obviously these ingredients are not present as oxides, as the antimony-, cobalt-, and phosphorus-containing compounds have undergone a chemical change.

However, it is convenient for the purpose of describing the composition of the frit, and to discuss the frit, to represent the same in terms of oxides, and the same has been followed in describing the present invention.

Having thus described the invention, what is claimed as new and desired to be secured by Letters Patent is:

1. A milled ground coat vitreous enamel adapted to be fired onto an iron base and characterized by a greatly increased firing range as compared to normal ground coat enamels, said enamel of increased firing range comprising the smelted frit reaction product of refractory and fluxing ingredients together with an adherence medium including a cobalt-containing constituent, the latter being present in the frit in an amount varying between about 0.05% and about 0.9% expressed as cobalto-cobaltic oxide, and a phosphorus-containing constituent in an amount adapted to substantially increase the burning range of the enamel while inhibiting any appearance of roughness in the fired enamel; and a milled-in antimony-containing medium in an amount adapted to promote the adherence of the enamel to an iron base while inhibiting any appearance of fuzziness in the fired enamel.

2. A milled ground coat vitreous enamel adapted to be fired onto an iron base and characterized by a greatly increased firing range as compared to normal ground coat enamels, said enamel of increased firing range comprising the smelted frit reaction product of refractory and fluxing ingredients together with an adherence medium including a cobalt-containing constituent, the latter being present in the frit in an amount varying between about .15% and about .3% expressed as cobalto-cobaltic oxide, and a phosphorus-containing constituent in an amount adapted to substantially increase the burning range of the enamel; and a milled-in antimony-containing medium in an amount adapted to promote the adherence of the enamel to an iron base while inhibiting any appearance of fuzziness in the fired enamel.

3. A milled ground coat vitreous enamel adapted to be fired into an iron base and characterized by a greatly increased firing range as compared to normal ground coat enamels, said enamel of increased firing range comprising the smelted frit reaction product of refractory and fluxing ingredients together with an adherence medium including a cobalt-containing constituent, the latter being present in the frit in an amount varying between about .05% and about .9% expressed as cobalto-cobaltic oxide, and a phosphorus containing constituent, the latter being present in the frit in an amount varying between about 4% and 0.25% expressed as phosphorus pentoxide; and a milled-in antimony adherence medium in an amount varying between about 5% to about 0.5% expressed as an antimony trixode, the latter percentage being taken on the weight of the frit present in the milled ground coat enamel.

4. A milled ground coat vitreous enamel adapted to be fired onto an iron base and characterized by a greatly increased firing range as compared to normal ground coat enamels, said enamel of increased firing range comprising the smelted frit reaction product of refractory and fluxing ingredients together with an adherence medium including a cobalt-containing constituent, the latter being present in the frit in an amount varying between about 0.15% and about 0.3% expressed as cobalto-cobaltic oxide and a phosphorus-containing constituent, the latter being present in the frit in an amount varying between about 4% and about 0.25% expressed as phosphorus pentoxide; and a milled-in antimony adherence medium in an amount varying between about 3% and about 0.5% expressed as an antimony trioxide, the latter percentage being taken on the weight of the frit present in the milled ground coat enamel.

5. A milled ground coat vitreous enamel adapted to be fired onto an iron base and characterized by a greatly increased firing range as compared to normal ground coat enamels, said enamel of increased firing range comprising the smelted frit reaction product of refractory and fluxing ingredients together with an adherence medium including a cobalt-containing constituent, the latter being present in the frit in an amount varying between about 0.15% and about 0.3% expressed as cobalto-cobaltic oxide and a phosphorus-containing constituent, the latter being present in the frit in an amount varying between about 4% and about 0.25% expressed as phosphorous pentoxide; and a milled-in antimony adherence medium in an amount varying between about 2.25% and about 0.5% expressed as an antimony trioxide, the latter percentage being taken on the weight of the frit present in the milled ground coat enamel.

6. A ground coat vitreous enamel adapted to be fired onto an iron base and characterized by a greatly increased firing range as compared to normal ground coat enamels, said enamel of increased firing range comprising the smelted raw batch charge of a mixture of (a) refractory and fluxing ingredients together with (b) a cobalt adherence constituent in an amount varying between about .05% and about .9% expressed as cobalto-cobaltic oxide and taken on the weight of the enamel frit, (c) a phosphorus-containing constituent in an amount adapted to substantially increase the burning range of the enamel, and (d) an antimony-containing medium in an amount adapted to promote the adherence of the enamel, while inhibiting any appearance of fuzziness in the fired enamel.

7. A ground coat vitreous enamel adapted to be fired onto an iron base and characterized by a greatly increased firing range as compared to normal ground coat enamels, said enamel of increased firing range comprising the smelted raw batch charge of a mixture of (a) refractory and fluxing ingredients together with (b) a cobalt adherence constituent in an amount varying between about .05% and about .9% expressed as cobalto-cobaltic oxide and taken on the weight of the enamel frit, (c) a phosphorus constituent in an amount adapted to substantially increase the burning range of the enamel, and (d) an antimony-containing medium having an antimony component in the form of $Sb_2O_3$, said antimony-containing medium being present in an amount adapted to promote the adherence of the enamel to an iron or steel base while inhibiting any appearance of fuzziness in the fired enamel, said mixture of refractory and fluxing ingredients, cobalt adherence medium and phosphorus constituent being substantially free of any oxidizing agent whereby oxidation of $Sb_2O_3$ is prevented on the smelting of the mixture to form the frit reaction product.

8. A ground coat vitreous enamel adapted to be fired onto an iron base and characterized by a greatly increased firing range as compared to normal ground coat enamels, said enamel of increased firing range comprising the smelted raw batch charge of a mixture of (a) refractory and fluxing ingredients together with (b) a cobalt adherence constituent in an amount varying between about .15% and about .3% expressed as cobalto-cobaltic oxide and taken on the weight of the enamel frit, (c) a phosphorus constituent in an amount adapted to substantially increase the burning range of the enamel, and (d) an antimony-containing medium having an antimony component in the form of $Sb_2O_3$, said antimony-containing medium being present in an amount adapted to promote the adherence of the enamel to an iron or steel base while inhibiting any appearance of fuzziness in the fired enamel, said mixture of refractory and fluxing ingredients, cobalt adherence medium and phosphorus constituent being substantially free of any oxidizing agent whereby oxidation of $Sb_2O_3$ is prevented on the smelting of the mixture to form the frit reaction product.

9. A ground coat vitreous enamel adapted to be fired onto an iron base and characterized by a greatly increased firing range as compared to normal ground coat enamels, said enamel of increased firing range comprising the smelted frit reaction product of a mixture of (a) refractory and fluxing ingredients, (b) an adherence medium including a cobalt constituent in an amount varying between about .05% and about .9% expressed as cobalto-cobaltic oxide, (c) a phosphorus constituent in an amount varying between about 4% and about 0.25% expressed as phosphorus pentoxide and (d) an antimony adherence medium in an amount varying between about 5% and about .1% expressed as antimony trioxide, said percentages being taken on the weight of the enamel frit.

10. A ground coat vitreous enamel adapted to be fired onto an iron base and characterized by a greatly increased firing range as compared to normal ground coat enamels, said enamel of increased firing range comprising the smelted frit reaction product of a mixture of (a) refractory and fluxing ingredients, (b) an adherence medium including a cobalt constituent in an amount varying between about .15% to about .3% expressed as cobalto-cobaltic oxide, (c) a phosphorus constituent in an amount varying between about 4% and about 0.25% expressed as phosphorus pentoxide and (d) an antimony adherence medium in an amount varying between about 3% and about 1% expressed as antimony trioxide, said percentages being taken on the weight of the enamel frit.

11. A milled ground coat vitreous enamel adapted to be fired onto an iron or steel base comprising a milled substantially dry mass containing as its essential components a frit product derived from a raw batch of refractory and fluxing constituents, and a mill addition product, one of said products containing (a) a cobalt-containing adherence agent in an amount sufficient to cause said enamel to adhere to an iron or steel base, and not exceeding .9% expressed as cobalto-cobaltic oxide and taken on the weight of the milled enamel, (b) a phosphorus-containing constituent in an amount adapted to substantially increase the burning range of the enamel while inhibiting any appearance of roughness in the fired enamel, and (c) an antimony-containing medium in an amount adapted to promote the adherence of the enamel to an iron base while inhibiting any appearance of fuzziness in the fired enamel.

12. A milled ground coat vitreous enamel adapted to be fired on to an iron base comprising a milled dry mass containing as its essential components a fritted product derived from a raw batch of refractory and fluxing constituents and a mill-addition product, one of said product having present a cobalt-containing adherence agent in an amount sufficient to cause the enamel to adhere to an iron or steel base and not exceeding about .9% expressed as cobalto-cobaltic oxide and taken on the weight of the milled dry enamel; one of said products also having present a phosphorus-containing constituent in an amount varying between about 4% and about 0.25% expressed as phosphorus pentoxide, said percentages being taken on the weight of the milled enamel; said milled ground coat enamel having milled therein an antimony-containing adherence medium in an amount adapted to promote the adherence of the fired enamel to an iron base while inhibiting any appearance of fuzziness in the fired enamel.

13. A milled ground coat vitreous enamel adapted to be fired on to an iron base comprising a milled dry mass containing as its essential components a fritted product derived from a raw batch of refractory and fluxing constituents and a mill-addition product, both of said products having present a cobalt-containing adherence agent in a total amount not exceeding .9% expressed as cobalto-cobaltic oxide and taken on the weight of the smelted frit present in the ground coat enamel, the predominating portion of the cobalt-containing adherence agent being present in the frit; one of said products also having present a phosphorus-containing constituent in an amount varying between about 4% and about 0.25% expressed as phosphorus pentoxide, said percentages being taken on the weight of the milled dry enamel; and an antimony-containing medium in an amount adapted to promote the adherence of the enamel to an iron base while inhibiting any appearance of fuzziness in the fired enamel.

14. The method comprising imparting adherence properties and simultaneously increasing the burning range of an enamel by smelting refractory and fluxing ingredients having incorporated therein a cobalt-containing adherence agent in an amount varying between .05% to .9%, expressed as cobalto-cobaltic oxide and taken on the weight of the resulting frit, and a phosphorus-containing constituent in an amount varying between 4% to about 0.25%, expressed as phosphorus pentoxide, such percentage being taken on the weight of the resulting enamel frit, and milling-in with the resulting frit an antimony-containing adherence agent in an amount varying between about 5% to about .05%, expressed as antimony trioxide, the latter percentage being taken on the weight of the milled dry enamel frit.

15. The method comprising imparting adherence properties and simultaneously increasing the burning range of an enamel by smelting refractory and fluxing ingredients having incorporated therein a cobalt-containing adherence agent in an amount varying between .15% to .3%, expressed as cobalto-cobaltic oxide and taken on the weight of the resulting frit, and a phosphorus-containing constituent in an amount varying between 4% to about 0.25%, expressed as phosphorus pentoxide, such percentage being taken on the weight of the resulting enamel frit, and milling in with the resulting frit an antimony-containing adherence agent in an amount varying between about .05% to about 5%, expressed as antimony trioxide, the latter percentage being taken on the weight of the milled dry enamel frit.

16. The method comprising firing an iron base carrying an applied vitreous enamel composition containing an enamel frit and a mill addition product, said frit having present a cobalt-containing adherence medium in an amount equal to about .25%, expressed as cobalto-cobaltic oxide, and a phosphorus-containing adherence medium equal to about 1%, expressed as phosphorus pentoxide, said mill addition having present about 1% of antimony trioxide taken on the weight of the enamel frit, said firing being sufficient to fuse the enamel composition, thereby causing the latter to adhere to said base.

17. The method comprising firing an iron base carrying an applied vitreous enamel composition containing an enamel frit and a mill addition product, said frit having present a cobalt-containing adherence medium in an amount varying between about .15% to about .25%, expressed as cobalto-cobaltic oxide, and a phosphorus-containing constituent in an amount substantially increasing the burning range of the enamel composition, said mill addition having present an antimony compound in an amount to promote the adherence of the enamel composition to the iron base, while inhibiting any appearance of fuzziness in the fused enamel.

18. The method comprising firing an iron base carrying an applied vitreous enamel composition, containing an enamel frit and a mill addition product, said frit having present a cobalt-containing adherence medium in an amount varying between about .15% to about .25%, expressed as cobalto-cobaltic oxide and a phosphorus-containing constituent in an amount substantially increasing the burning range of the enamel, said mill addition having present 2.25% to 0.5% of $Sb_2O_3$ acting in conjunction with said cobalt-containing and phosphorus-containing media to promote the adherence of the fused enamel composition to the iron base.

19. The method comprising increasing the burning range of a vitreous enamel composition applied to an iron base, said composition containing an enamel frit derived from a raw batch of refractory and fluxing constituents, including a cobalt-containing adherence medium in an amount varying between about .05% to about .9%, expressed as cobalto-cobaltic oxide taken on the weight of the frit, by adding to such batch a phosphorus-containing medium in an amount varying between about 4% to about 0.25%, expressed as phosphorus pentoxide taken on the weight of the enamel frit, said enamel composition having present an antimony-containing compound in an amount promoting the adherence of the enamel composition to the iron base while inhibiting any appearance of fuzziness in the fused enamel.

20. A fired article comprising a sheet iron base to which there is inherently locked a vitreous enamel formed from a vitreous enamel composition containing an enamel frit derived from a raw batch of refractory and fluxing constituents including a cobalt-containing adherence medium in an amount varying between about .05% to about .9%, expressed as cobalto-cobaltic oxide and taken on the weight of the enamel frit and a phosphorus-containing constituent in an amount substantially increasing the burning range of the enamel while inhibiting any appearance of roughness in the fused and fired enamel, said enamel composition having present an antimony-containing medium in an amount adapted to promote the adherence of the enamel to the iron base while inhibiting any appearance of fuzziness in the fused and fired enamel.

LYMAN CYRUS ATHY.
PAUL C. STUFFT.